United States Patent
Zhou

(10) Patent No.: US 11,973,601 B2
(45) Date of Patent: Apr. 30, 2024

(54) METHOD AND DEVICE FOR TRANSMITTING HARQ CODEBOOK

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 563 days.

(21) Appl. No.: 17/269,913

(22) PCT Filed: Aug. 23, 2018

(86) PCT No.: PCT/CN2018/102025
§ 371 (c)(1),
(2) Date: Feb. 19, 2021

(87) PCT Pub. No.: WO2020/037624
PCT Pub. Date: Feb. 27, 2020

(65) Prior Publication Data
US 2021/0314101 A1    Oct. 7, 2021

(51) Int. Cl.
*H04L 1/1812* (2023.01)
*H04B 7/0456* (2017.01)
(Continued)

(52) U.S. Cl.
CPC ......... *H04L 1/1819* (2013.01); *H04B 7/0456* (2013.01); *H04L 1/1896* (2013.01); *H04W 74/0816* (2013.01)

(58) Field of Classification Search
CPC ... H04B 7/0456; H04L 1/1819; H04L 1/1861; H04L 1/1896; H04L 5/001; H04L 5/0055;
(Continued)

(56) References Cited

U.S. PATENT DOCUMENTS

2014/0307596 A1* 10/2014 He .................. H04L 1/189
                                                          370/280
2017/0048884 A1*  2/2017 Jung ................ H04L 5/001
(Continued)

FOREIGN PATENT DOCUMENTS

WO    2017164626 A2    9/2017
WO    2018128474 A1    7/2018

OTHER PUBLICATIONS

OA for IN application 202147012154, mailed on Feb. 3, 2022.
(Continued)

*Primary Examiner* — Shah M Rahman
(74) *Attorney, Agent, or Firm* — Syncoda LLC; Feng Ma

(57) ABSTRACT

A method for transmitting a HARQ codebook includes: generating a HARQ codebook for an information block, in which one bit in the HARQ codebook indicates whether a downlink code block group (CBG) is successfully received; for one channel occupancy time (COT), integrating multiple HARQ codebooks corresponding to multiple information blocks into one integrated HARQ codebook, in which one COT corresponds to multiple information blocks, one information block corresponds to at least one transmission block, and one transmission block corresponds to at least one CBG, and one information block includes a physical downlink control channel transmission and a physical downlink data channel transmission; and transmitting the integrated HARQ codebook to a base station.

15 Claims, 13 Drawing Sheets

(51) Int. Cl.
*H04L 1/1867* (2023.01)
*H04W 74/0816* (2024.01)

(58) Field of Classification Search
CPC ... H04L 1/1607; H04L 1/1812; H04L 1/1825; H04L 1/1864; H04W 74/0816
See application file for complete search history.

(56) References Cited

U.S. PATENT DOCUMENTS

| | | | |
|---|---|---|---|
| 2017/0093620 A1* | 3/2017 | Um | H04L 5/0048 |
| 2018/0098345 A1 | 4/2018 | Tiirola et al. | |
| 2018/0115992 A1* | 4/2018 | Park | H04W 16/14 |
| 2018/0242286 A1* | 8/2018 | Song | H04L 1/0072 |
| 2018/0317244 A1* | 11/2018 | Um | H04W 72/23 |
| 2019/0028242 A1* | 1/2019 | Xiao | H04L 1/16 |
| 2019/0141727 A1* | 5/2019 | Si | H04L 1/1887 |
| 2019/0363843 A1* | 11/2019 | Gordaychik | H04L 1/08 |
| 2020/0099475 A1* | 3/2020 | Amuru | H04L 1/1887 |
| 2020/0228289 A1* | 7/2020 | He | H04L 1/1861 |
| 2021/0006377 A1* | 1/2021 | Hooli | H04L 1/1864 |
| 2021/0344451 A1* | 11/2021 | Hedayat | H04L 1/1861 |

OTHER PUBLICATIONS

Search Report for EP Application No. 18930569.1, mailed on Feb. 24, 2022.
International Search Report in the international application No. PCT/CN2018/102025, mailed on May 24, 2019.
Nokia et al. "HARQ Operation on NR Unlicensed" 3GPP TSG RAN WG1 Meeting #94, R1-1808820, Gothenburg, Sweden, Aug. 20-24, 2018.
LG Electronics. "HARQ Procedure for NR Unlicensed Operation" 3GPP TSG RAN WG1 Meeting #94, R1-1808509, Gothenburg, Sweden, Aug. 20-24, 2018.

* cited by examiner

|  | Slot n | Slot n+1 | Slot n+2 | Slot n+3 |
|---|---|---|---|---|
| CC0 (CBG number=4) | (1/3) | (4/6) | | |
| CC1 (CBG number=2) | | (5/6) | | (10/13) |
| CC2 (CBG number=1) | (2/3) | (6/6) | | |
| CC3 (CBG number=2) | | | (7/9) | |
| CC4 (CBG number=3) | | | | |
| CC5 (CBG number=3) | (3/3) | | | (11/13) |
| CC6 (CBG number=2) | | | (8/9) | (12/13) |
| CC7 (CBG number=3) | | | (9/9) | (13/13) |

FIG. 6

METHOD AND DEVICE FOR TRANSMITTING HARQ CODEBOOK

CROSS-REFERENCE TO RELATED APPLICATIONS

The present application is a national stage of International Application No. PCT/CN2018/102025 filed on Aug. 23, 2018, the disclosure of which is hereby incorporated by reference in its entirety.

TECHNICAL FIELD

The present disclosure relates to a field of communication technology, and more particularly to a method for transmitting a hybrid automatic repeat request (HARQ) codebook and an apparatus for transmitting an HARQ codebook.

BACKGROUND

In the related art, the fifth-generation (5G) mobile communication system proposes a code block group (CBG) as a transmission unit. In a scene of transmitting a hybrid automatic repeat request (HARQ), it is required to feed back an acknowledgement (ACK) or a non-acknowledgement (NACK) to the CBG. For the HARQ of multiple sub-carriers, it is required to perform effective encoding and aggregation on retransmission information of multiple component carriers (CC), i.e., an HARQ codebook is generated, so as to report retransmission feedback information uniformly.

For an unlicensed frequency band based system, user equipment (UE) needs for follow a listen before talk (LBT) mechanism, which means that it is detected whether a time-frequency resource of the HARQ codebook is idle in advance, if yes, the HARQ codebook can be reported. However, in a case that the time-frequency resource is not idle, it is still a problem whether to upload the HARQ codebook unreported previously when the next detection is performed and how to upload the HARQ codebook unreported previously.

SUMMARY

Embodiments of the present disclosure provide a method for transmitting a hybrid automatic repeat request (HARQ) codebook and an apparatus for transmitting an HARQ codebook. The technical solution can be described as follows.

According to a first aspect of the present disclosure, a method for transmitting an HARQ codebook is provided. The method includes generating an HARQ codebook for an information block, in which one bit in the HARQ codebook indicates whether a downlink code block group (CBG) is successfully received; for a channel occupancy time (COT) unit, integrating a plurality of HARQ codebooks respectively corresponding to a plurality of information blocks into an integrated HARQ codebook, in which one COT unit corresponds to a plurality of information blocks, one information block corresponds to at least one transmission block, one transmission block corresponds to at least one CBG, and one information block includes a physical downlink control channel transmission and a physical downlink data channel transmission; and transmitting the integrated HARQ codebook to a base station.

The technical solution of the embodiment of the present disclosure may have following benefits. In the embodiment, the plurality of HARQ codebooks are integrated for one time transmission, such that transmission feedback information may be reported in time and network resource occupied by the transmission feedback information can be saved.

In an embodiment, the HARQ codebook corresponds to a matrix, a maximum CBG number and a total number of downlink assignment indexes (DAI) of the information block are respectively configured as a row number and a column number of the matrix. The maximum CBG number represents a maximum value of CBG numbers corresponding respectively to a plurality of transmission blocks in the information blocks.

The technical solution of the embodiment of the present disclosure may have following benefits. In the embodiment, the HARQ codebook may be a matrix having the maximum CBG number and the total number of DAIs of the information block configured as the row number and the column number, which is convenient for the base station to parse the HARQ codebook, such that the CBGs corresponding to the bits in the HARQ codebook can be clearly understood.

In an embodiment, for a COT unit, integrating a plurality of HARQ codebooks respectively corresponding to a plurality of information blocks into an integrated HARQ codebook includes: for the COT unit, aligning the plurality of HARQ codebooks at a matrix dot (0,0); performing an AND operation per bit to obtain the integrated HARQ codebook. A maximum value of row numbers and a maximum value of column numbers of the plurality of HARQ codebooks are configured as a row number and a column number of the integrated HARQ codebook.

The technical solution of the embodiment of the present disclosure may have following benefits. In the embodiment, a way of integrating the plurality of HARQ codebooks is provided as a possible implementation.

In an embodiment, the method further includes integrating a plurality of integrated HARQ codebooks corresponding respectively to a plurality of COT units into a final HARQ codebook. Transmitting the integrated HARQ codebook to the base station includes transmitting the final HARQ codebook to the base station.

The technical solution of the embodiment of the present disclosure may have following benefits. In the embodiment, the plurality of integrated HARQ codebooks may be integrated to obtain the final HARQ codebook, such that the network resource occupied by the transmission feedback information may be further saved.

In an embodiment, the information block corresponds to a plurality of component carriers.

The technical solution of the embodiment of the present disclosure may have following benefits. The embodiment supports on reporting the transmission feedback information of a plurality of component carriers.

According to a second aspect of the present disclosure, a method for transmitting an HARQ codebook is provided. The method is applicable to a base station and includes receiving an integrated HARQ codebook sent by user equipment, in which the integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission; determining a plurality of information blocks corresponding to the integrated HARQ codebook; and determining CBGs in the plurality of information blocks that correspond to bits in the integrated HARQ codebook.

In an embodiment, receiving the integrated HARQ codebook sent by the user equipment includes receiving a final HARQ codebook sent by the user equipment. The method further includes determining a plurality of COT units corresponding to the final HARQ codebook.

In an embodiment, the information block corresponds to a plurality of component carriers.

According to a third aspect of the present disclosure, an apparatus for transmitting an HARQ codebook is provided. The apparatus is applicable to user equipment and includes a generating module, a first integrating module and a transmitting module. The generating module is configured to generate an HARQ codebook for an information block, in which one bit in the HARQ codebook indicates whether a downlink code block group (CBG) is successfully received. The first integrating module is configured to integrate a plurality of HARQ codebooks respectively corresponding to a plurality of information blocks into an integrated HARQ codebook for a channel occupancy time (COT) unit, in which one COT unit corresponds to a plurality of information blocks, one information block corresponds to at least one transmission block, one transmission block corresponds to at least one CBG, and one information block includes a physical downlink control channel transmission and a physical downlink data channel transmission. The transmitting module is configured to transmit the integrated HARQ codebook to a base station.

In an embodiment, the HARQ codebook corresponds to a matrix, a maximum CBG number and a total number of downlink assignment indexes (DAI) of the information block are respectively configured as a row number and a column number of the matrix. The maximum CBG number represents a maximum value of CBG numbers corresponding respectively to a plurality of transmission blocks in the information blocks.

In an embodiment, the first integrating module includes an aligning sub-module and an integrating sub-module. The aligning sub-module is configured to align the plurality of HARQ codebooks at a matrix dot (0,0) for the COT unit. The integrating sub-module is configured to perform an AND operation per bit to obtain the integrated HARQ codebook. A maximum value of the row numbers and a maximum value of column numbers of the plurality of HARQ codebooks are configured as a row number and a column number of the integrated HARQ codebook.

In an embodiment, the apparatus further includes a second integrating module configured to integrate a plurality of integrated HARQ codebooks corresponding respectively to a plurality of COT units into a final HARQ codebook. The transmitting module includes a transmitting sub-module configured to transmit the final HARQ codebook to the base station.

In an embodiment, the information block corresponds to a plurality of component carriers.

According to a fourth aspect of the present disclosure, an apparatus for transmitting an HARQ codebook is provided. The apparatus is applicable to a base station and includes a receiving module, a first determining module and a second determining module. The receiving module is configured to receive an integrated HARQ codebook sent by user equipment, in which the integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission. The first determining module is configured to determine a plurality of information blocks corresponding to the integrated HARQ codebook. The second determining module is configured to determine CBGs in the plurality of information blocks that correspond to bits in the integrated HARQ codebook.

In an embodiment, the receiving module includes a receiving sub-module configured to receive a final HARQ codebook sent by the user equipment. The apparatus further includes a third determining module configured to determine a plurality of COT units corresponding to the final HARQ codebook.

In an embodiment, the information block corresponds to a plurality of component carriers.

According to a fifth aspect of the present disclosure, an apparatus for transmitting an HARQ codebook is provided. The apparatus includes a processor and memory configured to store instructions executable by the processor. The processor is configured to generate an HARQ codebook for an information block, in which one bit in the HARQ codebook indicates whether a downlink code block group (CBG) is successfully received; integrate a plurality of HARQ codebooks respectively corresponding to a plurality of information blocks into an integrated HARQ codebook for a channel occupancy time (COT) unit, in which one COT unit corresponds to a plurality of information blocks, one information block corresponds to at least one transmission block, one transmission block corresponds to at least one CBG, and one information block includes a physical downlink control channel transmission and a physical downlink data channel transmission; and transmit the integrated HARQ codebook to a base station.

According to a sixth aspect of the present disclosure, an apparatus for transmitting an HARQ codebook is provided. The apparatus includes a processor and memory configured to store instructions executable by the processor. The processor is configured to receive an integrated HARQ codebook sent by user equipment, in which the integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission; determine a plurality of information blocks corresponding to the integrated HARQ codebook; and determine CBGs in the plurality of information blocks that correspond to bits in the integrated HARQ codebook.

According to a seventh aspect of embodiments of the present disclosure, a computer-readable storage medium is provided. The computer-readable storage medium has computer instructions stored thereon. When the instructions are executed by a processor, the method applicable to user equipment is implemented.

According to an eighth aspect of embodiments of the present disclosure, a computer-readable storage medium is provided. The computer-readable storage medium has computer instructions stored thereon. When the instructions are executed by a processor, the method applicable to a base station is implemented.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the present disclosure. The accompanying drawings together with the specification explain the principle of the present disclosure.

FIG. 6 is a schematic diagram illustrating an information block according to an example embodiment.

DETAILED DESCRIPTION

Figure 1:
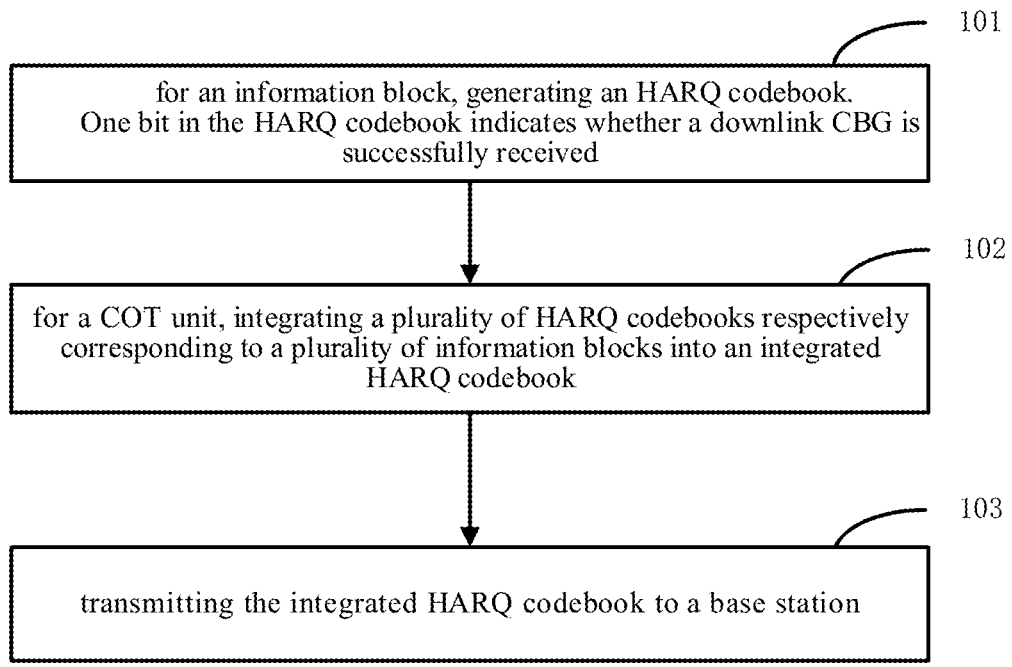
FIG. 1 is a flowchart illustrating a method for transmitting an HARQ codebook according to an example embodiment.

Reference will be made in detail to embodiments of the present disclosure. Throughout the descriptions with reference to the accompanying drawings, unless specified or limited otherwise, the same or similar elements and the elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

In the related art, for an unlicensed frequency band based system, a hybrid automatic repeat request (HARQ) technology can be adopted. For a case of receiving downlink information, transmission feedback information, such as an acknowledgement (ACK) or a non-acknowledgement (NACK) can be fed back to a base station. For one downlink information block, one corresponding HARQ codebook can be reported. One bit in the HARQ codebook indicates a receiving condition of one code block group (CBG) in the downlink information block. If a value of the bit is 1, then it indicates an ACK. If the value is 0, then it indicates a NACK. CBG is a smaller data unit in a transmission block (TB). However, the unlicensed frequency band based system needs for follow a listen before talk (LBT) mechanism, which means that it is detected whether there is sufficient idle time-frequency resource for reporting the HARQ codebook before reporting the HARQ codebook, if no, the HARQ codebook may be not reported. In this case, it is still a problem whether to upload the HARQ codebook unreported previously when the next detection is performed and how to upload the HARQ codebook unreported previously.

To solve the problem, embodiments of the present disclosure provide a technical solution of integrating a plurality of HARQ codebooks. A plurality of HARQ codebooks which are should reported but not reported are integrated into an HARQ codebook, i.e., an integrated HARQ codebook. The integrated HARQ codebook comprises transmission feedback information represented by the plurality of HARQ codebooks, such that network resource occupied by the transmission feedback information can be saved and the transmission feedback information can be reported in time.

FIG. 1 is a flowchart illustrating a method for transmitting an HARQ codebook according to an example embodiment. The method is applicable to user equipment. The user equipment may be a mobile phone, a computer, a digital broadcast terminal, a messaging device, a game console, a tablet device, a medical device, a fitness device, a personal digital assistant, and so on. As illustrated in FIG. 1, the method includes following blocks 101-103.

At block 101, for an information block, an HARQ codebook is generated. One bit in the HARQ codebook indicates whether a downlink CBG is successfully received.

At block 102, for a COT unit, a plurality of HARQ codebooks respectively corresponding to a plurality of information blocks are integrated into an integrated HARQ codebook. One COT unit corresponds to a plurality of information blocks, one information block corresponds to at least one transmission block, one transmission block corresponds to at least one CBG, and one information block includes a physical downlink control channel transmission and a physical downlink data channel transmission.

At block 103, the integrated HARQ codebook is transmitted to a base station.

In the embodiment, downlink information corresponding to a plurality of HARQ codebooks which need to be reported but not reported is represented by a COT. COT can be a maximum COT.

Figure 2A:
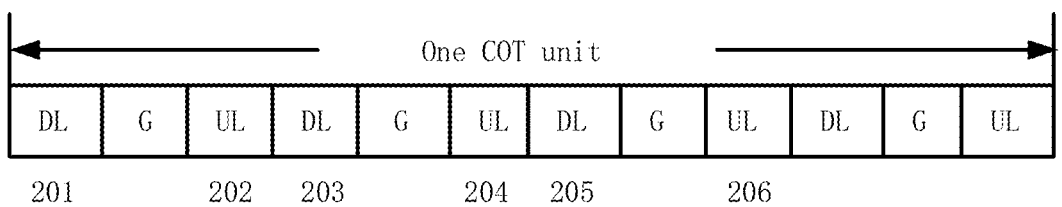
FIG. 2A is a schematic diagram illustrating a COT according to an example embodiment.

As illustrated in FIG. 2A, DL represents a downlink, G represents a gap and UL represents an uplink. DL includes a physical downlink control channel and a physical downlink data channel. If user equipment receives downlink information at 201, transmission feedback information, i.e., HARQ codebook needs to be reported at 202 to indicate whether the downlink information is successfully received at 201. However, it is required to detect whether a time-frequency resource of 202 is idle in advance, if yes, an HARQ codebook 1 of 201 is reported, if no, the HARQ codebook 1 is not reported at 202. Then, it is detected whether a time-frequency resource of 204 is idle, if yes, the HARQ codebook 1 and an HARQ codebook 2 of 203 need to be reported.

Of course, the time-frequency resource 202 is not detected and the HARQ codebook 1 is generated after 201 based on a system configuration. Then, it is detected whether the time-frequency resource of 204 is idle, if yes, the HARQ codebook 1 and the HARQ codebook 2 of 203 need to be reported.

Regardless of which case occurs, when the HARQ codebook 1 and the HARQ codebook 2 need to be reported, the HARQ codebook 1 and the HARQ codebook 2 are integrated into an integrated HARQ codebook in the embodiment, i.e., the two HARQ codebooks are integrated into one HARQ codebook. The integrated HARQ codebook reflects receiving conditions at 201 and 203. Further, the integrated HARQ codebook occupies less network resource, which may be easy to detect, thus leading to a higher report rate.

In the embodiment, when it is detected whether the time-frequency resource of 204 is idle, i.e., when an HARQ codebook is reported, the HARQ codebook 1 and the HARQ codebook 2 are integrated. When the time-frequency resource of 206 is idle, the HARQ codebook 1, the HARQ codebook 2 and the HARQ codebook 3 are integrated. Or, if the time-frequency resource of 204 is not idle, the HARQ codebook 1 and the HARQ codebook 2 are integrated to obtain an integrated HARQ codebook 1, and when the time-frequency resource of 206 is idle the integrated HARQ codebook 1 and the HARQ codebook 3 are integrated to obtain an integrated HARQ codebook 2.

Figure 2B:
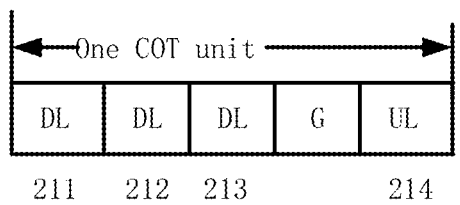
FIG. 2B is a schematic diagram illustrating a COT according to an example embodiment.

As illustrated in FIG. 2B, for downlink information corresponding to three information blocks 211, 212 and 213, an integrated HARQ codebook is fed back in an uplink corresponding to 214. The integrated HARQ codebook is a result of integrating three HARQ codebooks corresponding to the three information blocks 211, 212 and 213.

In an embodiment, the HARQ codebook corresponds to a matrix. A maximum CBG number (i.e., the maximum number of CBGs) and a total number of downlink assignment indexes (DAI) of the information block are respectively configured as a row number and a column number of the matrix. The maximum CBG number represents a maximum value of CBG numbers corresponding respectively to a plurality of transmission blocks in the information blocks.

In the embodiment, the HARQ codebook is actually in a string form, but the downlink reflected by the HARQ codebook can correspond to a matrix. A valid coordinate point in the matrix corresponds to one bit in the string, and to one downlink CBG. In the embodiment, the maximum CBG number and the total DAI (i.e., the total number of DAIs) are used to define the row number and the column number of the matrix. One column in the matrix corresponds to one TB. One row in the column corresponds to one CBG in the TB. A plurality of TBs are arranged from high to low in frequency domain, and from big to small in time domain, which conforms an order to counting DAIs. Of course, the TBs can be arranged in other order, which may be specified in a system in advance. One TB may correspond to one slot.

In the embodiment, by adopting the matrix, it is easy to generate an HARQ codebook and to integrate HARQ codebooks, thus facilitating the base station to parse an HARQ codebook.

In an embodiment, block 102 may include step A1 and step A2.

In step A1, for a COT unit, a plurality of HARQ codebooks corresponding to a plurality of information blocks are aligned at a matrix dot (0,0).

In step A2, an AND operation is performed per bit, so as to obtain an integrated HARQ codebook. A maximum value of row numbers and a maximum value of column numbers of the plurality of HARQ codebooks are configured as a row number and a column number of the integrated HARQ codebook.

Figure 3:
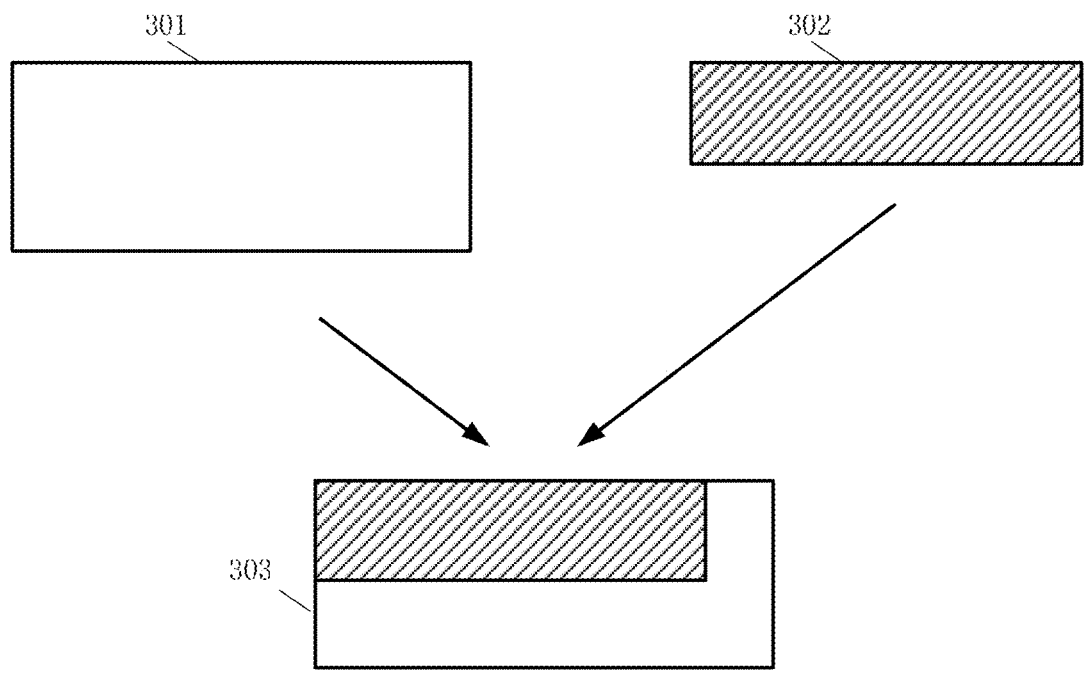
FIG. 3 is a schematic diagram illustrating an HARQ codebook according to an example embodiment.

For example, as illustrated in FIG. 3, 301 represents the HARQ codebook 1, which is a 4×13 matrix. 302 represents the HARQ codebook 2, which is a 2×10 matrix. 301 and 302 are aligned at a left corner (0,0). The AND operation is performed on bits at coincident coordinate points and a value of the bit at non-coincident coordinate point is unchanged, so as to obtain an integrated HARQ codebook, i.e., 303. It can be seen from FIG. 3 that the integrated HARQ codebook 303 is a 4×13 matrix. In the embodiment, a size of the integrated HARQ codebook is the same as that of the HARQ codebook 1, which occupies less network resource.

Figure 4:
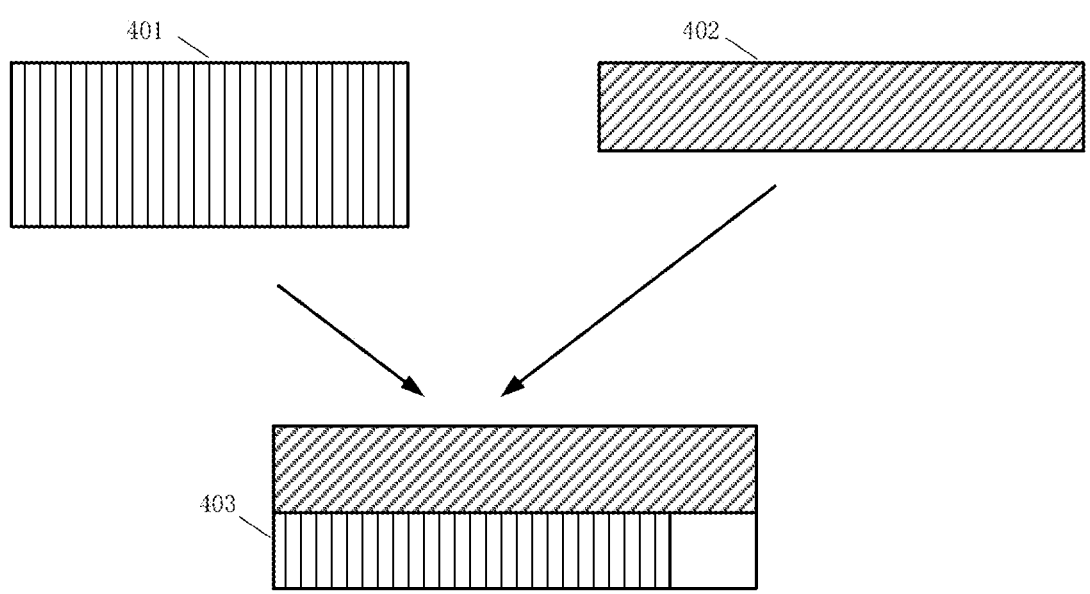
FIG. 4 is a schematic diagram illustrating an HARQ codebook according to an example embodiment.

For example, with reference to FIG. 4, 401 represents the HARQ codebook 1, which is a 4×13 matrix. 402 represents the HARQ codebook 2, which is a 2×20 matrix. 401 and 402 are aligned at a left corner (0,0). The AND/OR operation is performed on bits at coincident coordinate points and a value of the bit at non-coincident coordinate point is unchanged, so as to obtain an integrated HARQ codebook, i.e., 403. It can be seen from FIG. 4 that the integrated HARQ codebook 403 is a 4×20 matrix.

In an embodiment, the method may further include step B1.

In step B1, a plurality of integrated HARQ codebooks corresponding to a plurality of COT units are integrated into a final HARQ codebook.

Block 103 may include step B2.

In step B2, the final HARQ codebook is transmitted to the base station.

In the embodiment, one COT unit corresponds to one integrated HARQ codebook. In multiple COT units, regardless of whether an integrated HARQ codebook is uploaded already, a plurality of integrated HARQ codebooks can be integrated into the final HARQ codebook and the final HARQ codebook is uploaded. The integration of the plurality of integrated HARQ codebooks may further save the network resource occupied by the transmission feedback information.

The user equipment may automatically integrate the integrated HARQ codebooks which are not uploaded. Alternatively, the user equipment may integrate the integrated HARQ codebooks which have been uploaded already based on an indication of the base station.

Figure 5A:
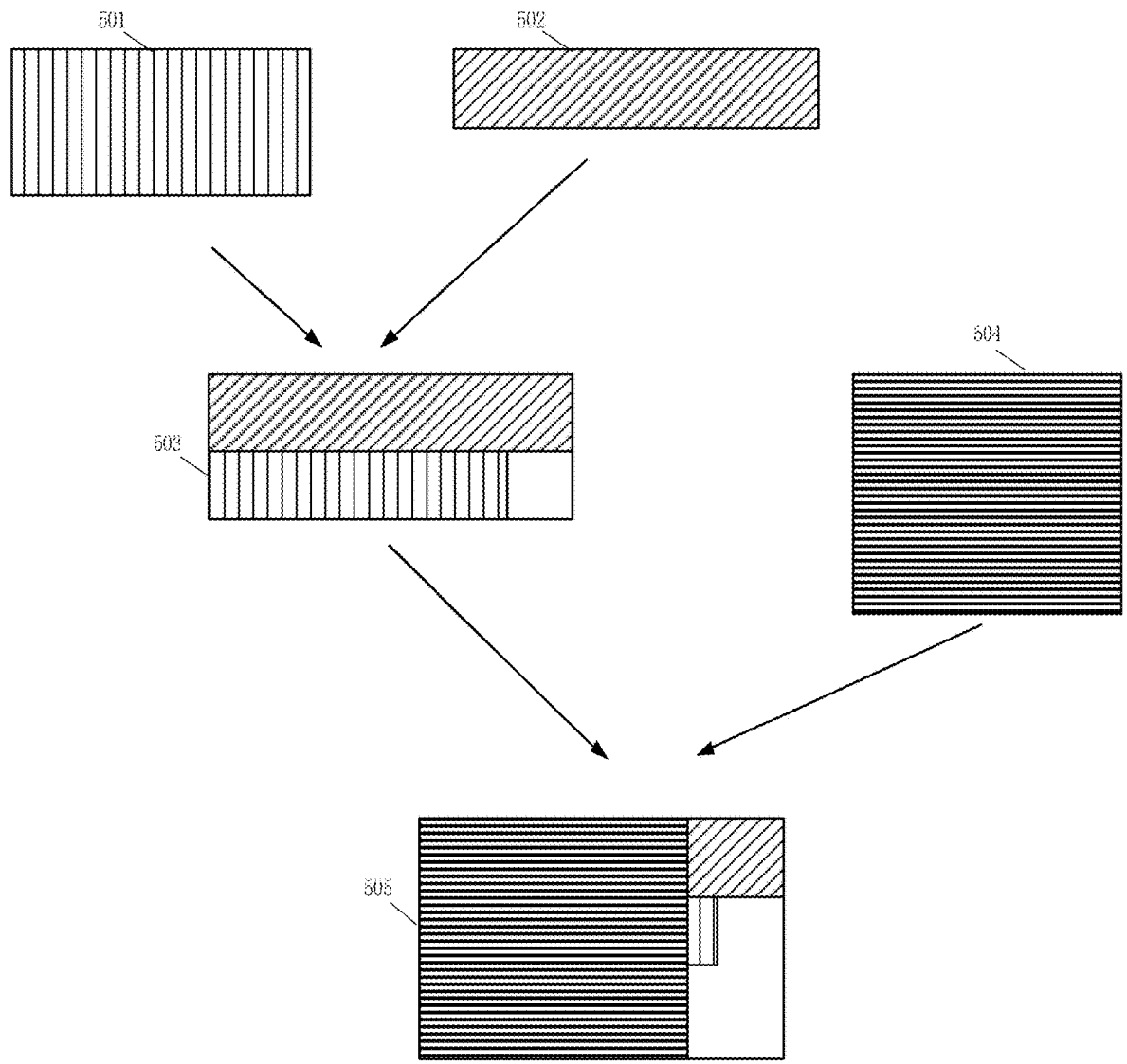
FIG. 5A is a schematic diagram illustrating an HARQ codebook according to an example embodiment.

For example, with reference to FIG. 5A, 501 represents the HARQ codebook 1, which is a 4×13 matrix. 502 represents the HARQ codebook 2, which is a 2×20 matrix. 501 and 502 are aligned at a left corner (0,0). The AND operation is performed on bits at coincident coordinate points and a value of the bit at non-coincident coordinate point is unchanged, so as to obtain an integrated HARQ codebook 1, i.e., 503, which is a 4×20 matrix. 503 and 504 (an integrated HARQ codebook 2, which is an 8×10 matrix) can be integrated to obtain a final HARQ codebook, i.e., 505, which is an 8×20 matrix.

Figure 5B:
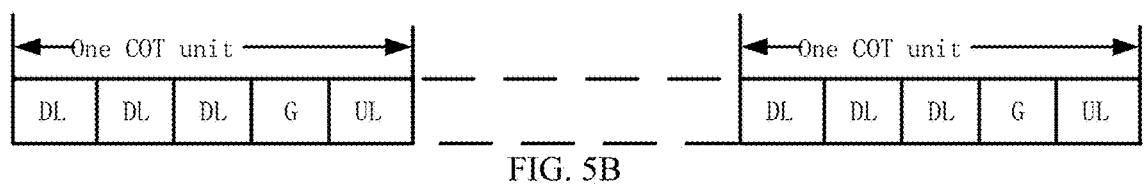
FIG. 5B is a schematic diagram illustrating a COT according to an example embodiment.

As illustrated in FIG. 5B, in multiple COT units, the uplink in each COT unit may be used to report an integrated HARQ codebook. In the uplink in the last COT, the final HARQ codebook can be reported.

In an embodiment, the information block corresponds to a plurality of component carriers (CC).

For example, with reference to FIG. 6, take eight CCs as an example, which may be CC0, CC1 . . . CC7 respectively. The TBs on different CCs may include different numbers of CBGs. The shadow line in FIG. 6 represents that there is downlink CBG transmission. One block represents one TB. The number in the block represents a counter (also called as serial number) of DAI/total DAI. The number may be used as an identification of the TB, which may be saved by both the user equipment and the base station. The information block shown in FIG. 6 corresponds to an HARQ codebook which is a 4×13 matrix. The first column in the matrix corresponds to four CBGs indicated by the number ⅓ in FIG. 6. The second column corresponds to one CBG indicated by the number ⅔ in FIG. 6, and so on.

An implementation at the user equipment may be described below in details.

Figure 7:
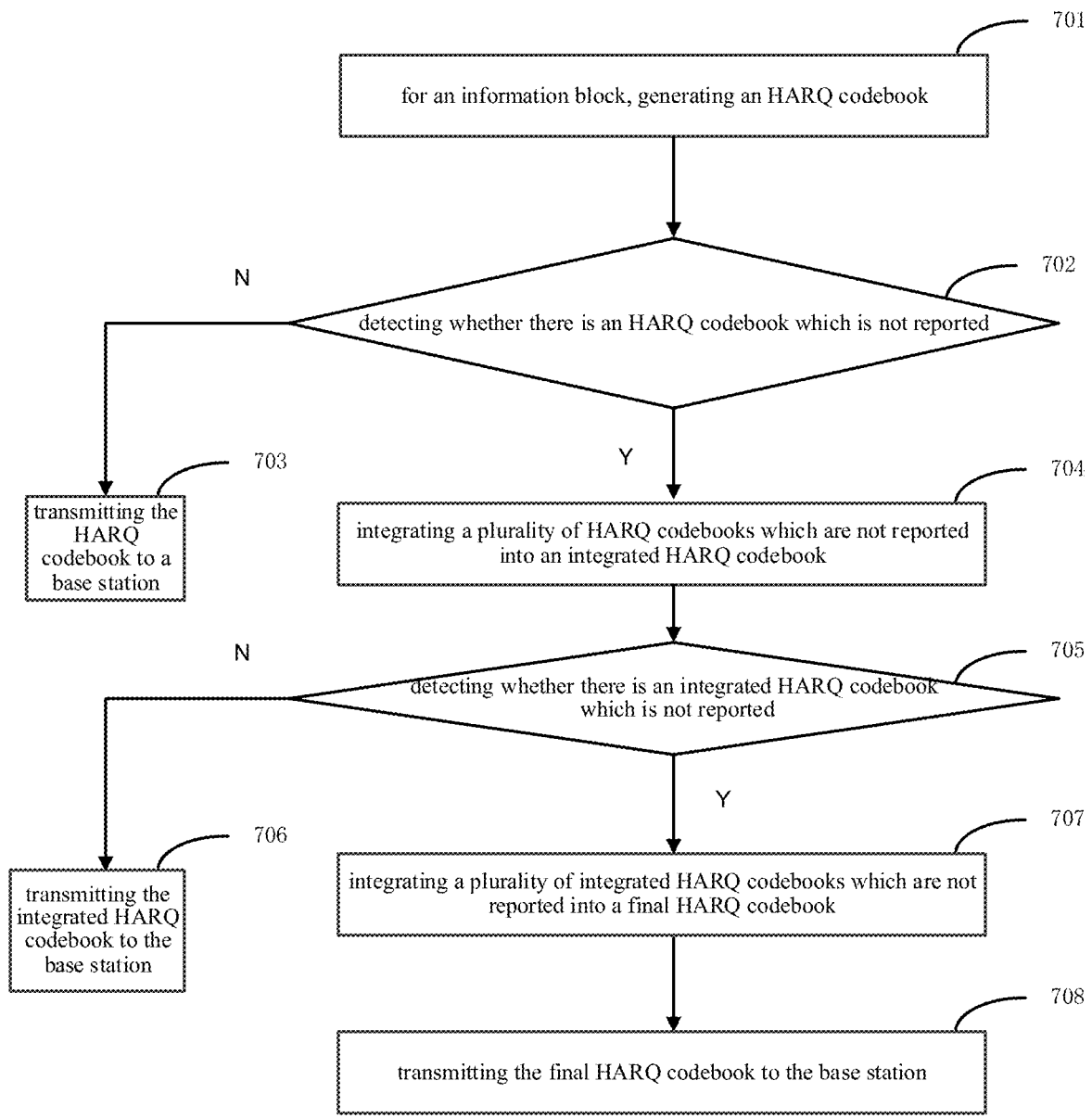
FIG. 7 is a flowchart illustrating a method for transmitting an HARQ codebook according to an example embodiment.

FIG. 7 is a flowchart illustrating a method for transmitting an HARQ codebook according to an example embodiment. The method is applicable to user equipment. The user equipment may be a mobile phone, a computer, a digital broadcast terminal, a messaging device, a game console, a tablet device, a medical device, a fitness device, a personal digital assistant, and so on. As illustrated in FIG. 7, the method includes following blocks 701-708.

At block 701, for an information block, an HARQ codebook is generated. One bit in the HARQ codebook indicates whether a downlink CBG is successfully received.

At block 702, it is detected whether there is an HARQ codebook which is not reported. If no, step at block 703 is executed, if yes, step at block 704 is executed.

At block 703, the HARQ codebook is transmitted to a base station.

Before transmitting the HARQ codebook, it is required to detect whether there is sufficient idle time-frequency resource, if yes, the HARQ codebook is transmitted, if no, the HARQ codebook is saved for detection at block 702.

At block 704, a plurality of HARQ codebooks which are not reported are integrated into an integrated HARQ codebook.

At block 705, it is detected whether there is an integrated HARQ codebook which is not reported. If no, step at block 706 is executed, if yes, step at block 707 is executed.

At block 706, the integrated HARQ codebook is transmitted to the base station.

At block 707, a plurality of integrated HARQ codebooks which are not reported are integrated into a final HARQ codebook.

At block 708, the final HARQ codebook is transmitted to the base station.

The implementation at the user equipment is described above. Correspondingly, the implementation at a base station is also improved. The implementation at the base station is described below.

Figure 8:
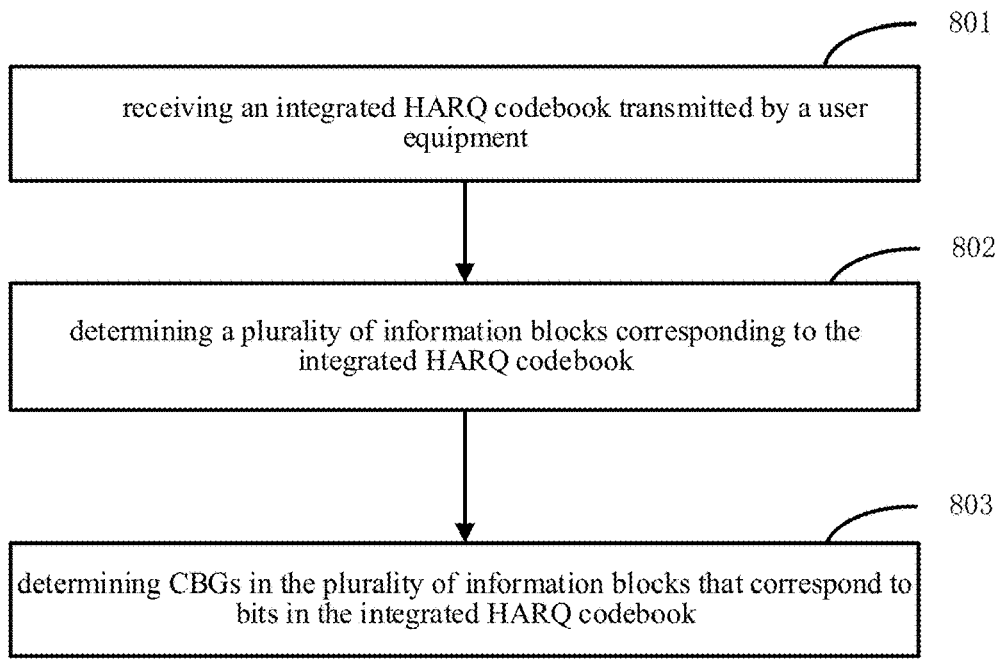
FIG. 8 is a flowchart illustrating a method for transmitting an HARQ codebook according to an example embodiment.

FIG. 8 is a flowchart illustrating a method for transmitting an HARQ codebook according to an example embodiment. The method is applicable to an accessing network device, such as a base station. As illustrated in FIG. 8, the method includes following blocks 801-803.

At block 801, an integrated HARQ codebook transmitted by user equipment is received. The integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission.

At block 802, a plurality of information blocks corresponding to the integrated HARQ codebook are determined.

At block 803, CBGs in the plurality of information blocks that correspond to bits in the integrated HARQ codebook are determined.

In the embodiment, since the integrated HARQ codebook is integrated from a plurality of HARQ codebooks, the base station needs to establish correspondence between the integrated HARQ codebook and information blocks, such that the base station can know the receiving conditions of which CBGs in the information blocks are represented by the bit in the integrated HARQ codebook.

The AND operation is performed when integrating the HARQ codebooks. If a value of a bit in the integrated HARQ codebook is 1, it indicates that corresponding CBGs in the information blocks are successfully received. If a value of a bit in the integrated HARQ codebook is 0, it indicates that corresponding CBGs in the information blocks are unsuccessfully received and need to be re-transmitted.

For example, when the HARQ codebooks are integrated, if the coordinate point (1,1) of the HARQ codebook 1 has a value 1, while the coordinate point (1,1) of the HARQ codebook 1 has a value 0, then after the AND operation, the coordinate point (1,1) of the integrated HARQ codebook 1 has a value 0. After the base station receives the integrated HARQ codebook 1, the base station may determine that the coordinate point (1,1) corresponds to one CBG 1 in the information block 1 and one CBG 2 in the information block 2. Since the coordinate point (1,1) of the integrated HARQ codebook 1 has a value 0, the base station determines that both the CBG 1 and the CBG 2 need to be re-transmitted.

For another example, continuing with the example of FIG. 3, the base station receives 303. When the base station performs the downlink transmission, information such as counter DAI/total DAI and the number of CBGs on each CC can be recorded. Although the base station may not generate an HARQ codebook, the base station may determine the CBG corresponding to the bit in the HARQ codebook. Further, the base station may record the information blocks whose HARQ codebooks are not received in advance, such that the base station may know which information blocks correspond to 303, and may know that the section corresponding to 2×10 of 303 is a coincident region which corresponds to the information block 1 and the information block 2 and remaining section is non-coincident region which corresponds to the information block 1.

In an embodiment, block 801 may include step C1.

In step C1, a final HARQ codebook transmitted by the user equipment is received.

The method may further include step C2.

In step C2, a plurality of COT units corresponding to the final HARQ codebook are determined.

In the embodiment, the base station may know whether the integrated HARQ codebooks are received for the COT units. If the integrated HARQ codebooks are not received for multiple COT units, then the final HARQ codebook is received at step C1. The multiple COT units corresponding to the final HARQ codebook need to be determined and then the information blocks in each COT unit and the CBGs corresponding to the final HARQ codebook need to be determined. Alternatively, the base station may instruct the user equipment to report the final HARQ codebook, and the base station may know that the final HARQ codebook is received at step C1.

In an embodiment, the information block corresponds to a plurality of component carriers.

The implementation at a base station will be described in details according to following embodiments.

Figure 9:
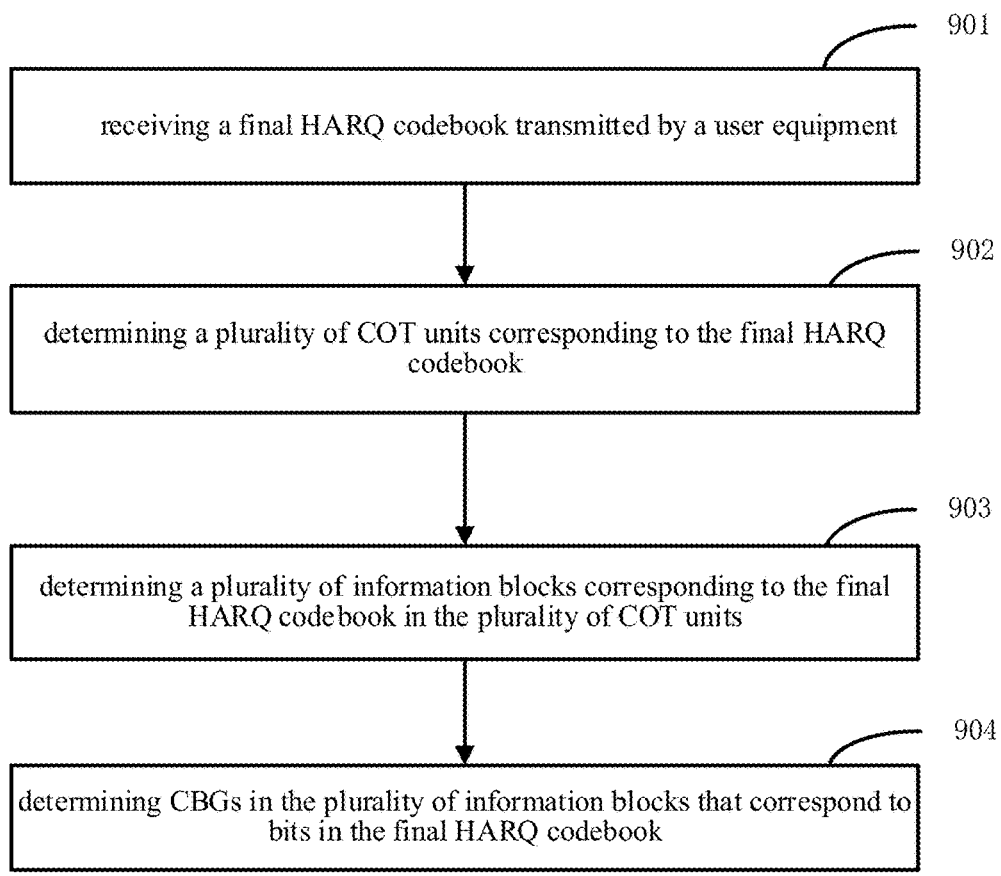
FIG. 9 is a flowchart illustrating a method for transmitting an HARQ codebook according to an example embodiment.

FIG. 9 is a flowchart illustrating a method for transmitting an HARQ codebook according to an example embodiment. The method is applicable to an accessing network device such as a base station. As illustrated in FIG. 9, the method may include blocks 901-904.

At block 901, a final HARQ codebook transmitted by user equipment is received.

At block 902, a plurality of COT units corresponding to the final HARQ codebook are determined.

At block 903, a plurality of information blocks corresponding to the final HARQ codebook are determined in the plurality of COT units.

At block 904, CBGs in the plurality of information blocks that correspond to bits in the final HARQ codebook are determined.

The implementation at user equipment and a base station will be described in details below.

Figure 10:
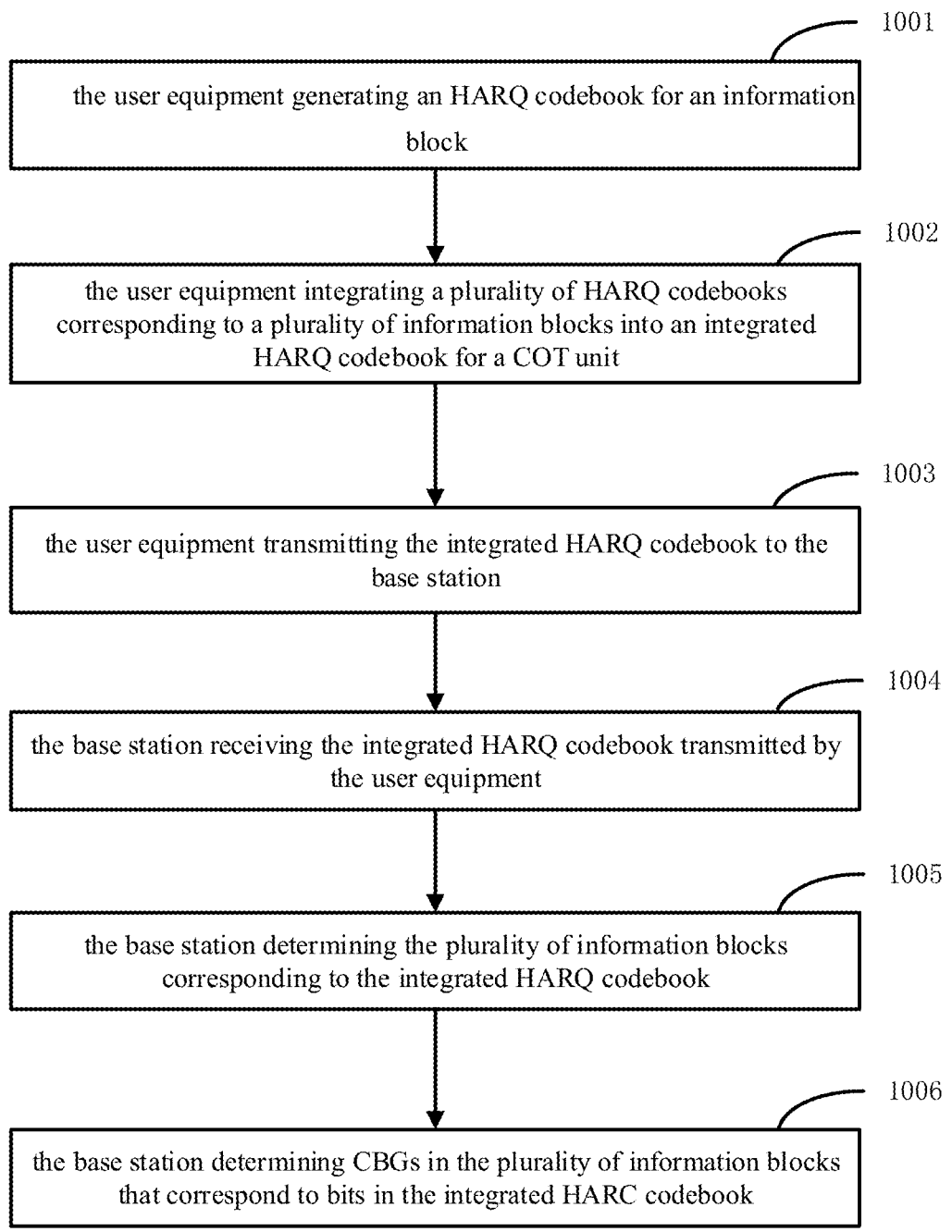
FIG. 10 is a flowchart illustrating a method for transmitting an HARQ codebook according to an example embodiment.

FIG. 10 is a flowchart illustrating a method for transmitting an HARQ codebook according to an embodiment. As illustrated in FIG. 10, the method may include blocks 1001-1003.

At block 1001, the user equipment generates an HARQ codebook for an information block. One bit in the HARQ codebook indicates whether a downlink CBG is successfully received.

At block 1002, the user equipment integrates a plurality of HARQ codebooks corresponding to a plurality of information blocks into an integrated HARQ codebook for a COT unit. One COT unit corresponds to a plurality of information blocks. One information block corresponds to at least one transmission block. One transmission block corresponds to at least one CBG. One information block includes a physical downlink control channel transmission and a physical downlink data channel transmission.

At block 1003, the user equipment transmits the integrated HARQ codebook to the base station.

At block 1004, the base station receives the integrated HARQ codebook transmitted by the user equipment.

At block 1005, the base station determines the plurality of information blocks corresponding to the integrated HARQ codebook.

At block 1006, the base station determines CBGs in the plurality of information blocks that correspond to bits in the integrated HARC codebook.

The above embodiments may be combined in any way as required.

Apparatus embodiments of the present disclosure will be described below, which may be used to implement the method embodiments of the present disclosure.

Figure 11:
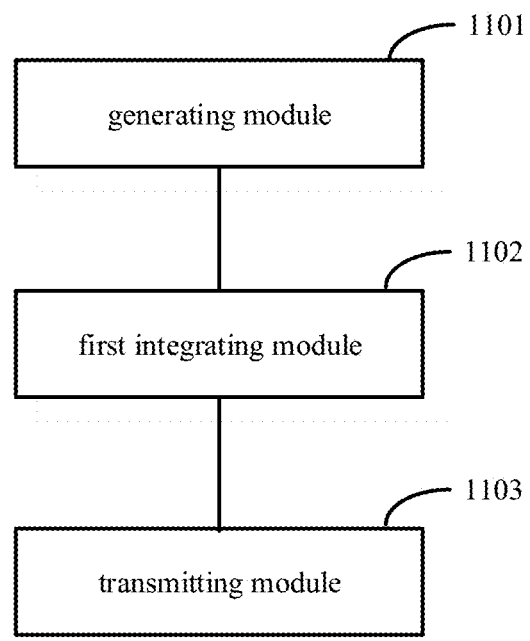
FIG. 11 is a block diagram illustrating an apparatus for transmitting an HARQ codebook according to an example embodiment.

FIG. 11 is a block diagram illustrating an apparatus for transmitting an HARQ codebook according to an example embodiment. The apparatus may be implemented as a part or all of an electronic device through software, hardware or a combination thereof. The apparatus is applicable at user equipment. As illustrated in FIG. 11, the apparatus may include a generating module 1101, a first integrating module 1102 and a transmitting module 1103.

The generating module 1101 is configured to generate an HARQ codebook for an information block. One bit in the HARQ codebook indicates whether a downlink CBG is successfully received.

The first integrating module 1102 is configured to integrate a plurality of HARQ codebooks corresponding to a plurality of information blocks into an integrated HARQ codebook for a COT unit. One COT unit corresponds to a plurality of information blocks. One information block corresponds to at least one transmission block. One transmission block corresponds to at least one CBG. One information block includes a physical downlink control channel transmission and a physical downlink data channel transmission.

The transmitting module 1103 is configured to transmit the integrated HARQ codebook to a base station.

In an embodiment, the HARQ codebook corresponds to a matrix, a maximum CBG number and a total number of downlink assignment indexes (DAI) of the information block are respectively configured as a row number and a column number of the matrix. The maximum CBG number represents a maximum value of CBG numbers corresponding respectively to a plurality of transmission blocks in the information blocks.

Figure 12:
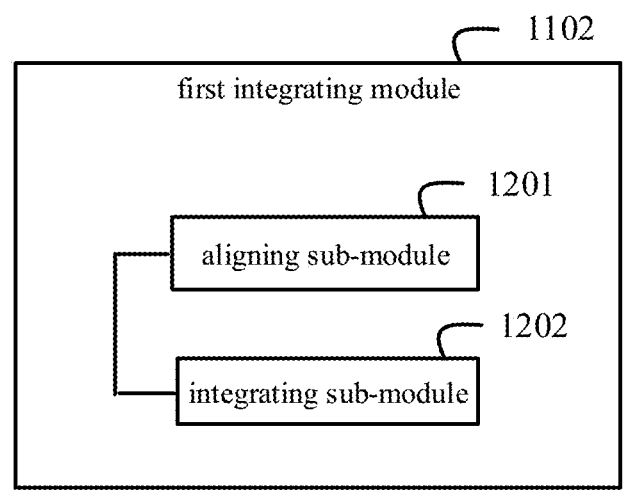
FIG. 12 is a block diagram illustrating a first integrating module according to an example embodiment.

In an embodiment, as illustrated in FIG. 12, the first integrating module 1102 includes an aligning sub-module 1201 and an integrating sub-module 1202.

The aligning sub-module 1201 is configured to align the plurality of HARQ codebooks at a matrix dot (0,0) for the COT unit.

The integrating sub-module 1202 is configured to perform an AND operation per bit to obtain the integrated HARQ codebook. A maximum value of the row numbers and a maximum value of column numbers of the plurality of HARQ codebooks are configured as a row number and a column number of the integrated HARQ codebook.

Figure 13:
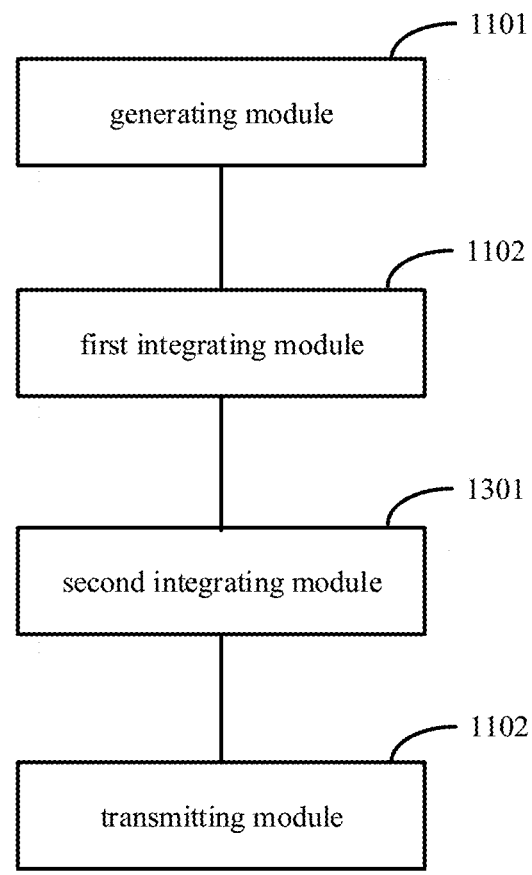
FIG. 13 is a block diagram illustrating an apparatus for transmitting an HARQ codebook according to an example embodiment.

In an embodiment, as illustrated in FIG. 13, the apparatus further includes a second integrating module 1301.

The second integrating module 1301 is configured to integrate a plurality of integrated HARQ codebooks corresponding respectively to a plurality of COT units into a final HARQ codebook.

Figure 14:
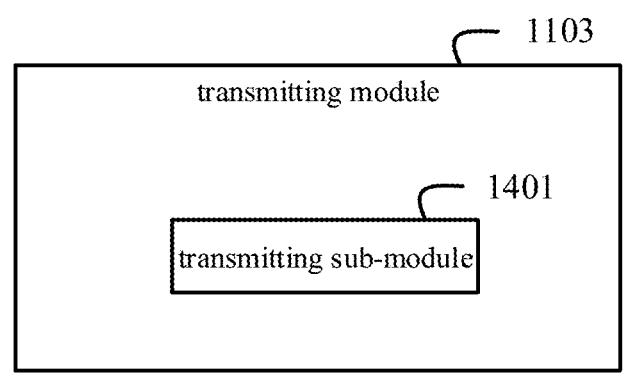
FIG. 14 is a block diagram illustrating a transmitting module according to an example embodiment.

As illustrated in FIG. 14, the transmitting module 1103 includes a transmitting sub-module 1401.

The transmitting sub-module 1401 is configured to transmit the final HARQ codebook to the base station.

In an embodiment, the information block corresponds to a plurality of component carriers.

Figure 15:
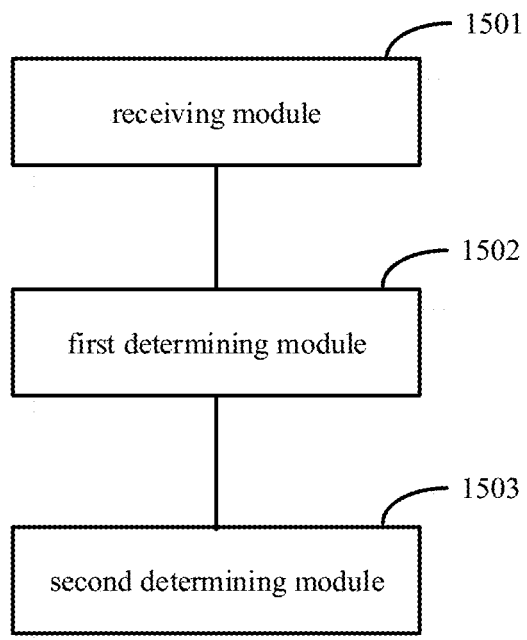
FIG. 15 is a block diagram illustrating an apparatus for transmitting an HARQ codebook according to an example embodiment.

FIG. 15 is a block diagram illustrating an apparatus for transmitting an HARQ codebook according to an example embodiment. The apparatus may be implemented as a part or all of an electronic device through software, hardware or a combination thereof. The apparatus is applicable at a base station. As illustrated in FIG. 15, the apparatus may include a receiving module 1501, a first determining module 1502 and a second determining module 1503.

The receiving module 1501 is configured to receive an integrated HARQ codebook sent by user equipment. The integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission.

The first determining module 1502 is configured to determine a plurality of information blocks corresponding to the integrated HARQ codebook.

The second determining module 1503 is configured to determine CBGs in the plurality of information blocks that correspond to bits in the integrated HARQ codebook.

Figure 16:
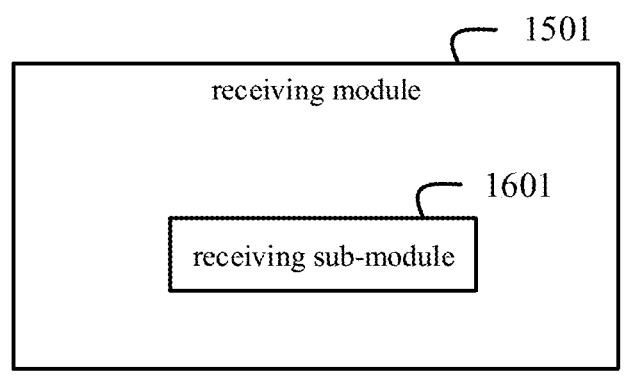
FIG. 16 is a block diagram illustrating a receiving module according to an example embodiment.

In an embodiment, as illustrated in FIG. 16, the receiving module 1501 includes a receiving sub-module 1601.

The receiving sub-module 1601 is configured to receive a final HARQ codebook sent by the user equipment.

Figure 17:
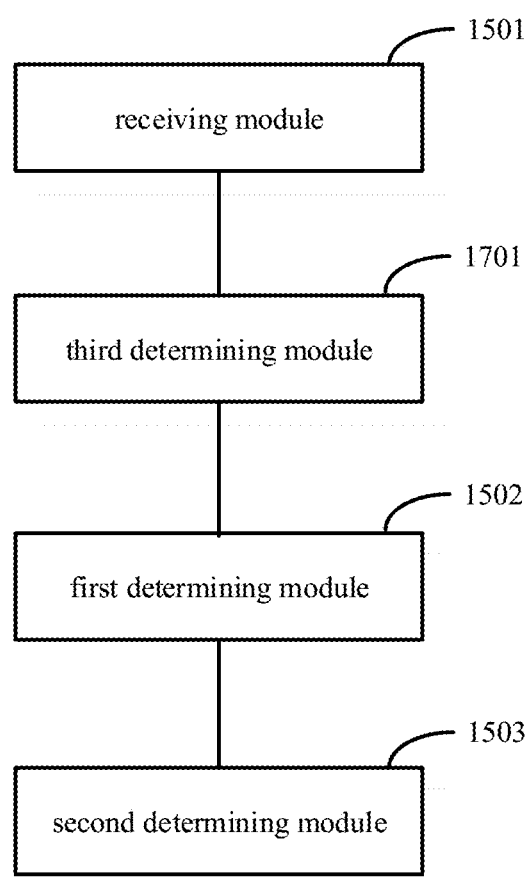
FIG. 17 is a block diagram illustrating an apparatus for transmitting an HARQ codebook according to an example embodiment.

As illustrated in FIG. 17, the apparatus further includes a third determining module 1701.

The third determining module 1701 is configured to determine a plurality of COT units corresponding to the final HARQ codebook.

In an embodiment, the information block corresponds to a plurality of component carriers.

With regard to the above described apparatus embodiments, the specific details that the modules perform the operations have been descried in the method embodiments, which are not described in detail herein.

Figure 18:
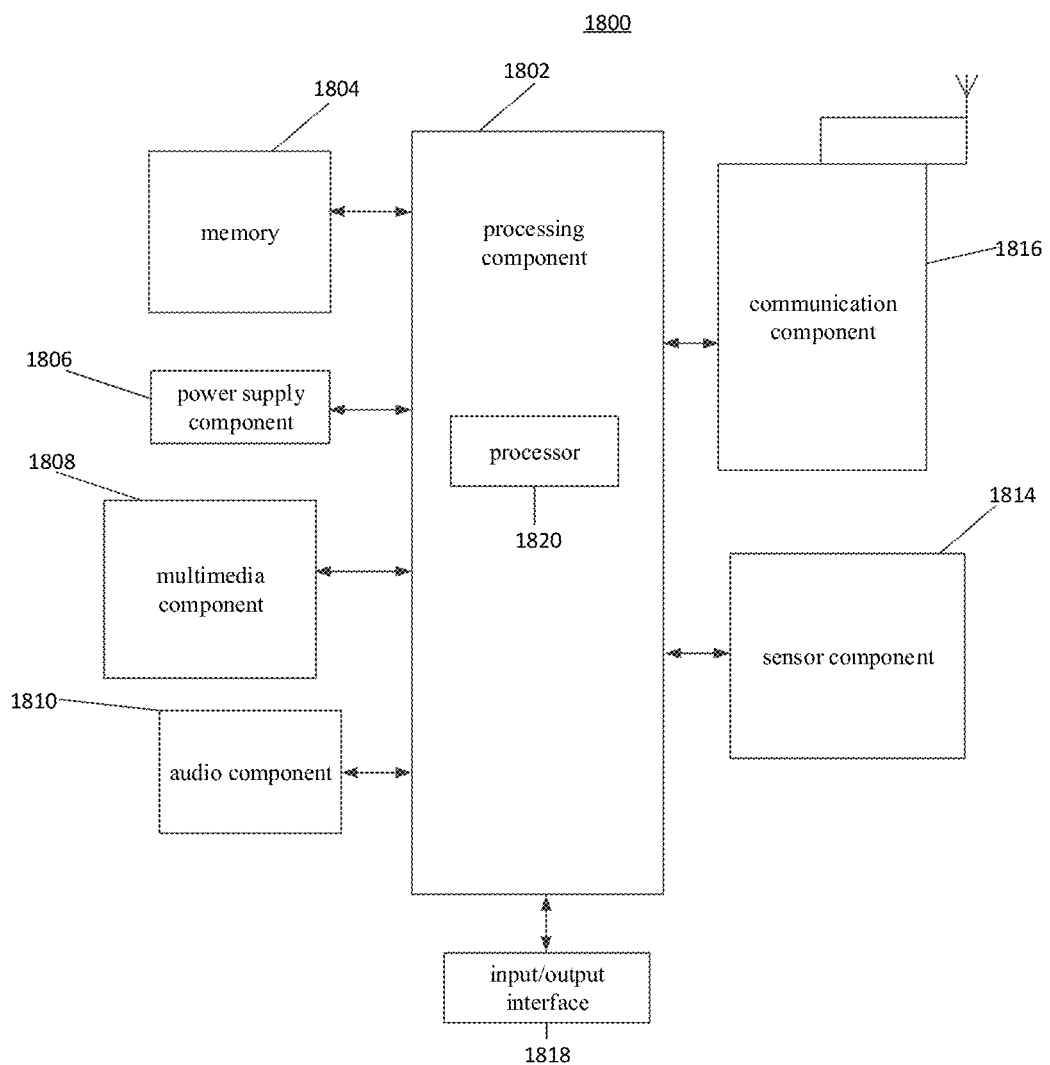
FIG. 18 is a block diagram illustrating an apparatus adapted to transmit an HARQ codebook according to an example embodiment.

FIG. 18 is a block diagram illustrating an apparatus for transmitting an HARQ codebook according to an example embodiment. For example, the apparatus 1800 may be a mobile phone, a computer, a digital broadcasting terminal, a messaging device, a game console, a tablet device, a medical device, a fitness device, a personal digital assistant, and so on.

The apparatus 1800 may include one or more of the following components: a processing component 1802, memory 1804, a power component 1806, a multimedia component 1808, an audio component 1810, an input/output (I/O) interface 1818, a sensor component 1814, and a communication component 1816.

The processing component 1802 generally controls the overall operations of the apparatus 1800, such as operations associated with display, telephone calls, data communications, camera operations, and recording operations. The processing component 1802 may include one or more processors 1820 to execute instructions to complete all or part of the steps of the aforementioned 8method. In addition, the processing component 1802 may include one or more modules to facilitate the interaction between the processing component 1802 and other components. For example, the processing component 1802 may include a multimedia module to facilitate the interaction between the multimedia component 1808 and the processing component 1802.

The memory 1804 is configured to store various types of data to support operations in the apparatus 1800. Examples of these data include instructions for any application or method operating on the apparatus 1800, contact data, phone book data, messages, pictures, videos, etc. The memory 1804 may be implemented by any type of volatile or non-volatile storage device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power component 1806 provides power to various components of the apparatus 1800. The power component 1806 may include a power management system, one or more power supplies, and other components associated with generating, managing, and distributing power to the apparatus 1800.

The multimedia component 1808 includes a screen that provides an output interface between the apparatus 1800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of the touch or slide action, but also detect the duration and pressure related to the touch or slide operation. In some embodiments, the multimedia component 1808 includes a front camera and/or a rear camera. When the apparatus 1800 is in an operation mode, such as a shooting mode or a video mode, the front camera and/or the rear camera can receive external multimedia data. Each front camera and rear camera may be a fixed optical lens system or have focal length and optical zooming capabilities.

The audio component 1810 is configured to output and/or input audio signals. For example, the audio component 1810 includes a microphone (MIC), and when the apparatus 1800 is in an operation mode, such as a call mode, a recording mode, and a voice recognition mode, the microphone is configured to receive external audio signals. The received audio signal may be further stored in the memory 1804 or transmitted via the communication component 1816. In some embodiments, the audio component 1810 further includes a speaker for outputting audio signals.

The I/O interface 1818 provides an interface between the processing component 1802 and a peripheral interface module. The peripheral interface module may be a keyboard, a click wheel, a button, and the like. These buttons may include but are not limited to: a home button, a volume button, a start button, and a lock button.

The sensor component 1814 includes one or more sensors for providing the apparatus 1800 with various aspects of state evaluation. For example, the sensor component 1814 may detect the opening/closing state of the apparatus 1000 and the relative positioning of the components. For example, the component is the display and the keypad of the apparatus 1800. The sensor component 1814 may also detect the position changes of the apparatus 1000 or a component of the apparatus 1800, a presence or absence of contacts between the user and the apparatus 1800, an orientation or an acceleration/deceleration of the apparatus 1800, and temperature changes of the apparatus 1800. The sensor assembly 1814 may include a proximity sensor configured to detect the presence of nearby objects when there is no physical contact. The sensor component 1814 may also include a light sensor, such as a CMOS or CCD image sensor, for use in imaging applications. In some embodiments, the sensor component 1814 may also include an acceleration sensor, a gyroscope sensor, a magnetic sensor, a pressure sensor or a temperature sensor.

The communication component 1816 is configured to facilitate wired or wireless communication between the apparatus 1800 and other devices. The apparatus 1800 may access a wireless network based on a communication standard, such as Wi-Fi, 2G, or 3G, or a combination thereof. In an example embodiment, the communication component 1816 receives a broadcast signal or broadcast related information from an external broadcast management system via a broadcast channel. In an example embodiment, the communication component 1816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example embodiment, the apparatus 1800 may be implemented by one or more application specific integrated circuits (ASIC), digital signal processors (DSP), digital signal processing devices (DSPD), programmable logic devices (PLD), a field programmable gate array (FPGA), controllers, microcontrollers, microprocessors, or other electronic components, used to implement the above-mentioned data transmission method.

In an example embodiment, there is also provided a non-transitory computer-readable storage medium including instructions, such as the memory 1804 including instructions, which may be executed by the processor 1820 of the apparatus 1800 to complete the above data transmission method. For example, the non-transitory computer-readable storage medium may be a ROM, a random access memory (RAM), a CD-ROM, a magnetic tape, a floppy disk, an optical data storage device, and so on.

In an example embodiment, an apparatus for transmitting an HARQ codebook is provided, including a processor and memory configured to store instructions executable by the processor. The processor is configured to generate an HARQ codebook for an information block, in which one bit in the HARQ codebook indicates whether a downlink code block group (CBG) is successfully received; integrate a plurality of HARQ codebooks respectively corresponding to a plurality of information blocks into an integrated HARQ codebook for a channel occupancy time (COT) unit, in which one COT unit corresponds to a plurality of information blocks, one information block corresponds to at least one transmission block, one transmission block corresponds to at least one CBG, and one information block includes a physical downlink control channel transmission and a physical downlink data channel transmission; and transmit the integrated HARQ codebook to a base station.

The processor may be further configured to determine the HARQ codebook corresponds to a matrix. A maximum CBG number and a total number of downlink assignment indexes (DAI) of the information block are respectively configured as a row number and a column number of the matrix. The maximum CBG number represents a maximum value of CBG numbers corresponding respectively to a plurality of transmission blocks in the information blocks.

The processor may be further configured to, for the COT unit, align the plurality of HARQ codebooks at a matrix dot (0,0) and perform an AND operation per bit to obtain the integrated HARQ codebook. A maximum value of row numbers and a maximum value of column numbers of the plurality of HARQ codebooks are configured as a row number and a column number of the integrated HARQ codebook.

The processor may be further configured to integrate a plurality of integrated HARQ codebooks corresponding respectively to a plurality of COT units into a final HARQ codebook. Transmitting the integrated HARQ codebook to the base station includes transmitting the final HARQ codebook to the base station.

The processor may be further configured to determine the information block corresponds to a plurality of component carriers.

A computer-readable storage medium is provided. The computer-readable storage medium has computer instructions stored thereon. When the instructions are executed by a processor of a device, the device may be caused to perform the above method. The method includes generating an HARQ codebook for an information block, in which one bit in the HARQ codebook indicates whether a downlink code block group (CBG) is successfully received; for a channel occupancy time (COT) unit, integrating a plurality of HARQ codebooks respectively corresponding to a plurality of information blocks into an integrated HARQ codebook, in which one COT unit corresponds to a plurality of information blocks, one information block corresponds to at least one transmission block, one transmission block corresponds to at least one CBG, and one information block includes a physical downlink control channel transmission and a physical downlink data channel transmission; and transmitting the integrated HARQ codebook to a base station.

The instructions stored in the computer-readable storage medium may further include, the HARQ codebook corresponds to a matrix, a maximum CBG number and a total number of downlink assignment indexes (DAI) of the information block are respectively configured as a row number and a column number of the matrix. The maximum CBG number represents a maximum value of CBG numbers corresponding respectively to a plurality of transmission blocks in the information blocks.

The instructions stored in the computer-readable storage medium may further include, for a COT unit, integrating a plurality of HARQ codebooks respectively corresponding to a plurality of information blocks into an integrated HARQ codebook includes: for the COT unit, aligning the plurality of HARQ codebooks at a matrix dot (0,0); performing an AND operation per bit to obtain the integrated HARQ codebook. A maximum value of row numbers and a maximum value of column numbers of the plurality of HARQ codebooks are configured as a row number and a column number of the integrated HARQ codebook.

The instructions stored in the computer-readable storage medium may further include, the method further includes integrating a plurality of integrated HARQ codebooks corresponding respectively to a plurality of COT units into a final HARQ codebook. Transmitting the integrated HARQ codebook to the base station includes transmitting the final HARQ codebook to the base station.

The instructions stored in the computer-readable storage medium may further include, the information block corresponds to a plurality of component carriers.

Figure 19:
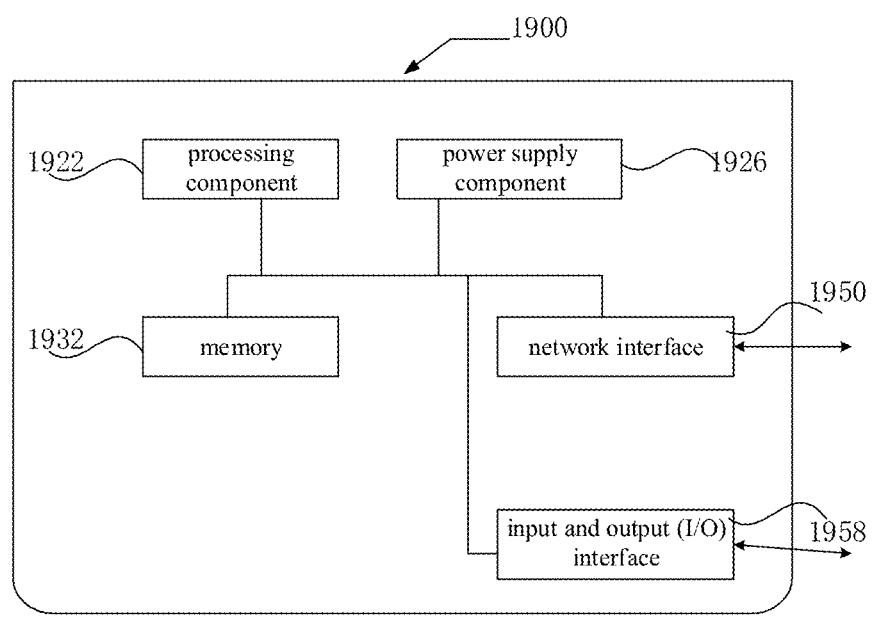
FIG. 19 is a block diagram illustrating an apparatus adapted to transmit an HARQ codebook according to an example embodiment.

FIG. 19 is a block diagram illustrating an apparatus 1900 for an HARQsynchronizing data according to an example embodiment. For example, the apparatus 1900 may be provided as a computer. Referring to FIG. 19, the apparatus 1900 may include a processing component 1922, which further includes one or more processors, and memory resource represented by memory 1932 for storing instructions executable by the processing component 1922, such as application programs. The application program stored in the memory 1932 may include one or more modules each corresponding to a set of instructions. In addition, the processing component 1922 is configured to execute instructions to perform the above method for an HARQsynchronizing data.

The apparatus 1900 may further include a power supply component 1926 configured to perform power management of the apparatus 1900, a wired or wireless network interface 1950 configured to connect the apparatus 1900 to the network, and an input and output (I/O) interface 1958. The apparatus 1900 could operate based on an operating system stored in the memory 1203, such as Windows Server™, Mac OS X™ Unix™, Linux™, FreeBSD™ or the like.

In an example embodiment, an apparatus for transmitting an HARQ codebook is provided, including a processor and memory configured to store instructions executable by the processor. The processor is configured to receive an integrated HARQ codebook sent by user equipment, in which the integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission; determine a plurality of information blocks corresponding to the integrated HARQ codebook; and determine CBGs in the plurality of information blocks that correspond to bits in the integrated HARQ codebook.

The processor may be further configured to receive an integrated HARQ codebook sent by user equipment by receiving a final HARQ codebook sent by the user equipment. The method further includes determining a plurality of COT units corresponding to the final HARQ codebook.

The processor may be further configured to determine the information block corresponds to a plurality of component carriers.

A computer-readable storage medium is provided. The computer-readable storage medium has computer instructions stored thereon. When the instructions are executed by a processor of a device, the device may be caused to perform the above method. The method includes receiving an integrated HARQ codebook sent by user equipment, in which the integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission; determining a plurality of information blocks corresponding to the integrated HARQ codebook; and determining CBGs in the plurality of information blocks that correspond to bits in the integrated HARQ codebook.

The instructions stored in the computer-readable storage medium may further include, receiving the integrated HARQ codebook sent by the user equipment includes receiving a final HARQ codebook sent by the user equipment. The method further includes determining a plurality of COT units corresponding to the final HARQ codebook.

The instructions stored in the computer-readable storage medium may further include, the information block corresponds to a plurality of component carriers.

Those skilled in the art will easily think of other embodiments of the present disclosure after considering the specification and practicing the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for transmitting a hybrid automatic repeat request (HARQ) codebook, applicable to user equipment, the method comprising:
   for an information block, generating an HARQ codebook, wherein one bit of the HARQ codebook indicates whether a downlink code block group (CBG) is successfully received;
   for a channel occupancy time (COT) unit, integrating a plurality of HARQ codebooks respectively corresponding to a plurality of information blocks into an integrated HARQ codebook, wherein one COT unit corresponds to a plurality of information blocks, one information block corresponds to at least one transmission block, one transmission block corresponds to at least one CBG, and one information block comprises a physical downlink control channel transmission and a physical downlink data channel transmission; and
   transmitting the integrated HARQ codebook to a base station;
   wherein the HARQ codebook corresponds to a matrix, a valid coordinate point in the matrix corresponds to one bit in the HARQ codebook, a maximum CBG number and a total number of downlink assignment indexes (DAI) of the information block are respectively configured as a row number and a column number of the matrix, wherein the maximum CBG number represents a maximum value of CBG numbers corresponding respectively to a plurality of transmission blocks in the information blocks;
   wherein said for a COT unit, integrating a plurality of HARQ codebooks respectively corresponding to a plurality of information blocks into an integrated HARQ codebook comprises:
   for the COT unit, aligning the plurality of HARQ codebooks at a matrix dot (0,0); and
   performing an AND operation per bit to obtain the integrated HARQ codebook, wherein a maximum value of row numbers and a maximum value of column numbers of the plurality of HARQ codebooks are configured as a row number and a column number of the integrated HARQ codebook.

2. The method of claim 1, further comprising:
   integrating a plurality of integrated HARQ codebooks corresponding to a plurality of COT units into a final HARQ codebook;
   wherein transmitting the integrated HARQ codebook to the base station comprises transmitting the final HARQ codebook to the base station.

3. The method of claim 1, wherein the information block corresponds to a plurality of component carriers.

4. A method for receiving a hybrid automatic repeat request (HARQ) codebook, applicable to a base station, the method comprising:
   receiving an integrated HARQ codebook sent by user equipment, wherein the integrated HARQ codebook corresponds to one channel occupancy time (COT) unit, one COT unit corresponds to a plurality of information blocks, one information block corresponds to at least one transmission block, one transmission block corresponds to at least one code block group (CBG), and one information block comprises a physical downlink control channel transmission and a physical downlink data channel transmission;
   determining a plurality of information blocks corresponding to the integrated HARQ codebook; and
   determining CBGs in the plurality of information blocks that correspond to bits in the integrated HARQ codebook;
   wherein the integrated HARQ codebook corresponds to a matrix, a valid coordinate point in the matrix corresponds to one bit in the HARQ codebook, a maximum CBG number and a total number of downlink assignment indexes (DAI) of the information block are respectively configured as a row number and a column number of the matrix, wherein the maximum CBG number represents a maximum value of CBG numbers corresponding respectively to a plurality of transmission blocks in the information blocks;

wherein the integrated HARQ codebook is generated by:
for the COT unit, aligning a plurality of HARQ codebooks at a matrix dot (0,0); and
performing an AND operation per bit to obtain the integrated HARQ codebook, wherein a maximum value of row numbers and a maximum value of column numbers of the plurality of HARQ codebooks are configured as a row number and a column number of the integrated HARQ codebook.

5. The method of claim 4, wherein
said receiving the integrated HARQ codebook sent by the user equipment comprises receiving a final HARQ codebook sent by the user equipment;
the method further comprises determining a plurality of COT units corresponding to the final HARQ codebook.

6. The method of claim 4, wherein the information block corresponds to a plurality of component carriers.

7. A user equipment (UE) for transmitting a hybrid automatic repeat request (HARQ) codebook, comprising:
a processor; and
memory configured to store instructions executable by the processor;
wherein processor is configured to:
for an information block, generate a hybrid automatic repeat request (HARQ) codebook, wherein one bit of the HARQ codebook indicates whether a downlink code block group (CBG) is successfully received;
for a channel occupancy time (COT) unit, integrate a plurality of HARQ codebooks respectively corresponding to a plurality of information blocks into an integrated HARQ codebook, wherein one COT unit corresponds to a plurality of information blocks, one information block corresponds to at least one transmission block, one transmission block corresponds to at least one CBG, and one information block comprises a physical downlink control channel transmission and a physical downlink data channel transmission; and
transmit the integrated HARQ codebook to a base station;
wherein the HARQ codebook corresponds to a matrix, a valid coordinate point in the matrix corresponds to one bit in the HARQ codebook, a maximum CBG number and a total number of downlink assignment indexes (DAI) of the information block are respectively configured as a row number and a column number of the matrix, wherein the maximum CBG number represents a maximum value of CBG numbers corresponding respectively to a plurality of transmission blocks in the information blocks;
wherein the processor is configured to integrate a plurality of HARQ codebooks respectively corresponding to a plurality of information blocks into an integrated HARQ codebook by:
for the COT unit, aligning the plurality of HARQ codebooks at a matrix dot (0,0); and
performing an AND operation per bit to obtain the integrated HARQ codebook, wherein a maximum value of row numbers and a maximum value of column numbers of the plurality of HARQ codebooks are configured as a row number and a column number of the integrated HARQ codebook.

8. An apparatus for receiving a hybrid automatic repeat request (HARQ) codebook implementing the method of claim 4, comprising:
a processor; and
memory configured to store instructions executable by the processor;
wherein processor is configured to perform operations including:
receiving an integrated HARQ codebook sent by user equipment, wherein the integrated HARQ codebook corresponds to one COT unit, one COT unit corresponds to a plurality of information blocks, one information block corresponds to at least one transmission block, one transmission block corresponds to at least one CBG, and one information block includes a physical downlink control channel transmission and a physical downlink data channel transmission;
determining a plurality of information blocks corresponding to the integrated HARQ codebook; and
determining CBGs in the plurality of information blocks that correspond to bits in the integrated HARQ codebook;
wherein the integrated HARQ codebook corresponds to a matrix, a valid coordinate point in the matrix corresponds to one bit in the HARQ codebook, a maximum CBG number and a total number of downlink assignment indexes (DAI) of the information block are respectively configured as a row number and a column number of the matrix, wherein the maximum CBG number represents a maximum value of CBG numbers corresponding respectively to a plurality of transmission blocks in the information blocks;
wherein the integrated HARQ codebook is generated by:
for the COT unit, aligning a plurality of HARQ codebooks at a matrix dot (0,0); and
performing an AND operation per bit to obtain the integrated HARQ codebook, wherein a maximum value of row numbers and a maximum value of column numbers of the plurality of HARQ codebooks are configured as a row number and a column number of the integrated HARQ codebook.

9. The UE of claim 7, wherein the processor is further configured to:
integrate a plurality of integrated HARQ codebooks corresponding to a plurality of COT units into a final HARQ codebook;
wherein the processor is further configured to transmit the integrated HARQ codebook to the base station by transmitting the final HARQ codebook to the base station.

10. The UE of claim 7, wherein the information block corresponds to a plurality of component carriers.

11. The apparatus of claim 8, wherein,
receiving the integrated HARQ codebook sent by the user equipment comprises receiving a final HARQ codebook sent by the user equipment;
wherein the processor is further configured to perform operation of determining a plurality of COT units corresponding to the final HARQ codebook.

12. The apparatus of claim 8, wherein the information block corresponds to a plurality of component carriers.

13. A communication system implementing the method of claim 1, comprising the user equipment, wherein
the UE is configured to integrate the plurality of HARQ codebooks for a one-time transmission, to thereby realize timely reporting of transmission feedback information and reducing network resource occupied by the transmission feedback information.

14. The communication system of claim 13, wherein
the UE supports reporting the transmission feedback information of a plurality of component carriers.

15. The communication system of claim 14, further comprising the base station, wherein the base station is configured to:
- receive the integrated HARQ codebook sent by the user equipment;
- determine the plurality of information blocks corresponding to the integrated HARQ codebook; and
- determine the CBGs in the plurality of information blocks that correspond to bits in the integrated HARQ codebook.

* * * * *